Oct. 27, 1959

B. J. GRACE 2,910,689

TRANSISTOR HORN

Filed Dec. 10, 1957

INVENTOR.
Billy Joe Grace

BY Mueller & Aichele

Attys.

United States Patent Office 2,910,689

Patented Oct. 27, 1959

2,910,689

TRANSISTOR HORN

Billy Joe Grace, Chicago, Ill., assignor to Motorola, Inc., Chicago, Ill., a corporation of Illinois Application December 10, 1957, Serial No. 701,795

6 Claims. (Cl. 340—384)

Figure 1:
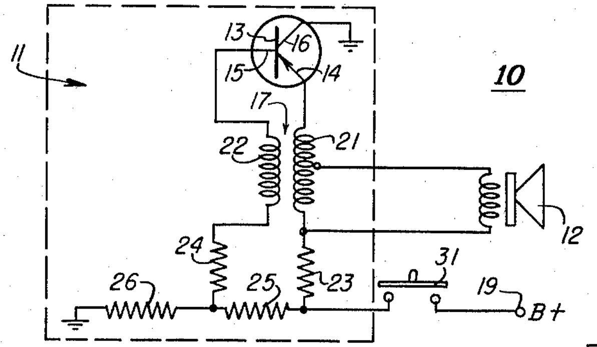

This invention relates generally to electronic sound producing devices and more particularly to a transistor powered electronic horn for use with automotive vehicles.

Electronic horns for use with automotive vehicles have previously been proposed and these have the advantage over conventional horns of operating more efficiently and producing a more pleasant sound. Such a horn is described in the copending application of Walter A. Kelley and Robert D. Mohler, Serial No. 698,948, filed on November 26, 1957, and assigned to the assignee of this invention. These previous electronic horns have operated satisfactorily, but it would be desirable to increase the power output of such horns so that a louder sound can be produced for country driving. However, when a louder output is obtained, this may be objectionable in certain cases as when driving slowly in the city.

It is an object of this invention to provide an improved electronic horn of more economical construction and increased efficiency.

Another object of the invention is to provide an improved oscillator circuit for an electronic horn which develops the required power output more efficiently.

Still another object of the invention is to provide an improved electronic horn for use with an automotive vehicle in which the volume of the horn is automatically controlled at different levels for city and country driving.

A feature of the invention is the provision of an improved electronic horn having an oscillator coupled to a loudspeaker with the oscillator being powered by a single transistor device.

A further feature of the invention is the provision of an improved electronic horn including a driver amplifier stage and an output amplifier stage which increase the level of the output of the horn to provide a very loud sound for country driving.

Still another feature of the invention is the provision of an improved electronic horn for a vehicle having an automatic control device operative in response to the speed of the vehicle to reduce the volume of the horn for city driving.

Figure 2:
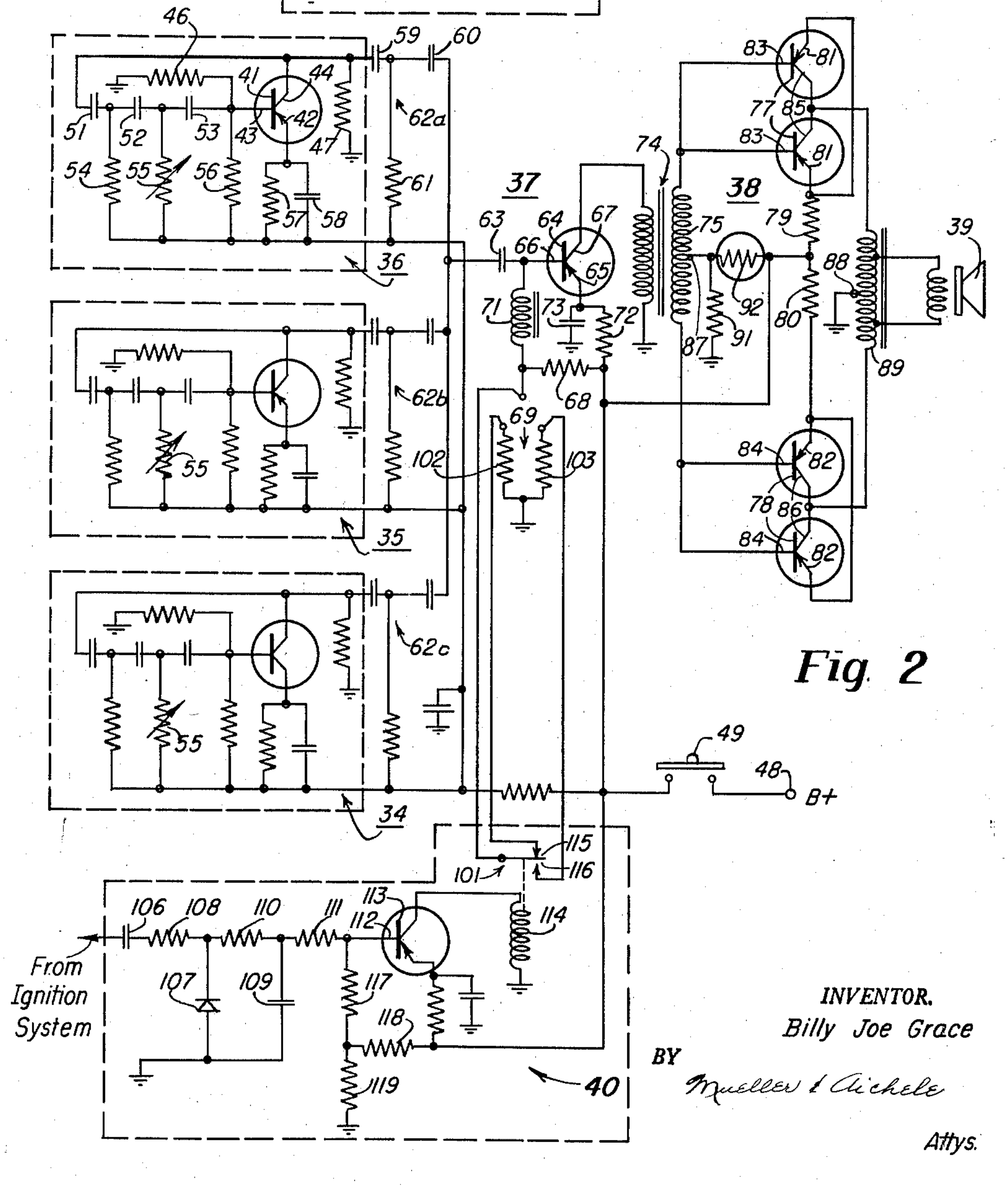

The invention is illustrated in the drawings, in which:

Fig. 1 is a circuit diagram for an electronic horn having an oscillator powered by a single transistor device in accordance with the invention; and Fig. 2 is a circuit diagram for an electronic horn having a plurality of oscillators and a speed control device.

The invention consists of an electronic horn including a transistor powered oscillator which produces oscillating electric signals. These oscillating signals may be converted directly by a loudspeaker into sound energy which can be heard at a safe distance since the improved oscillator circuit is capable of delivering the signals at a relatively high level. On the other hand, amplifying stages may be added to increase the level of the signals in order to produce a very loud sound which gives effective warning of the approach of the vehicle at even greater distances. A volume control device is provided to reduce the loudness of the horn when the vehicle is moving at lower speeds characteristic of city driving. Additional oscillators may be provided to produce signals of different frequencies so that the output of the horn is a combination of tones which produces a more pleasing effect.

The circuit of a simplified electronic horn in accordance with the invention is shown in Fig. 1. The horn 10 includes an oscillator circuit 11 and a loudspeaker 12. The loudspeaker 12 is of standard construction and therefore will not be described in detail. A five inch weatherproof speaker of the type commonly used with railroad equipment has been used with satisfactory results.

The oscillator circuit 11 includes a single power transistor device 13 of the P–N–P junction type having an emitter electrode 14, a base electrode 15, and a collector electrode 16. The primary winding 21 of the transformer 17 and the resistor 23 are series coupled in the emitter circuit, and the feedback winding 22 and the resistor 24 are series connected in a base circuit. The plus terminal of the voltage source 19 is connected to the resistor 23, and a resistor 25 is coupled between the emitter and base circuits and the voltage thereacross serves to bias the emitter electrode 14 positively with respect to the base electrode 15. The resistor 26 is coupled between the base circuit and ground, and the voltage thereacross serves to bias the base electrode 15 positively with respect to the collector electrode 16 which is also grounded.

The value of resistor 26 is selected to set the operating current of the circuit which may be of the order of 1.5 amps. The resistors 23 and 24 serve respectively as stabilizing resistors for the emitter and base electrodes. The primary winding 21 has sufficient distributed capacitance to act as a tuned circuit providing energy storage. This capacitance and the inductance controlled by the number of turns in this winding, govern the frequency of oscillation. Thus, the number of turns in the primary may be adjusted to provide the desired frequency of oscillations. Positive feedback is applied to the base electrode from the primary winding through the feedback winding 22 to provide the regeneration required to sustain oscillations. The primary winding 21 is tapped at a point between its ends to form an output auto-transformer, so that the impedance of the lower portion of the winding matches that of the loudspeaker 12. The loudspeaker 12 is coupled across this portion of the primary winding.

The oscillator 11 produces an oscillating electric signal which is applied to the loudspeaker 12, and is converted thereby into sound energy. The oscillator circuit employs a power transistor device which provides a relatively high power output so that a sufficiently loud sound for warning purposes is produced without further amplification. This is true even though the horn employs only one power transistor device and operates on relatively low currents because of the improved efficiency of the oscillator circuit.

Fig. 2 shows the circuit of another embodiment of the invention which is capable of producing a very loud sound for country driving and a softer sound for city driving. The horn includes an oscillator 36, a driver amplifier stage 37, an output amplifier stage 38, a loudspeaker 39, and a speed control circuit 40. The oscillator 36 produces an oscillating signal whose frequency may be adjusted within a predetermined range as will be explained. By providing additional oscillators 34 and 35 of the same construction but adjusted to produce signals of different frequencies, the sound produced by the horn has a 3-tone effect which is more pleasing to the ear than a single tone.

The oscillator 36 includes a transistor device 41 of the P–N–P junction type having an emitter electrode 42, a base electrode 43, and a collector electrode 44. Direct current voltage is applied to the emitter electrode 42 from the plus terminal 48 when the switch 49 is closed, so the emitter is polarized positively with respect to the base. The voltage across resistor 46 connected between the base electrode 43 and ground polarizes the base positively with respect to the collector. The resistor 57 coupled to the emitter electrode 42 serves to limit the current flow through the transistor device, and makes possible the use of transistors having a wider spread of carrier transfer characteristics. The capacitor 58 is a by-pass which serves to prevent the circuit from becoming degenerative. Feedback is applied from the collector electrode 44 to the base, and the required 180° phase shift is provided by the network consisting of the capacitors 51, 52 and 53, and the resistors 54, 55 and 56. The values of these components of the phase shift network determine the basic frequency of oscillation, and since the resistor 55 is a variable resistor, its value may be adjusted to vary the frequency of oscillation within a predetermined range. Thus, when a plurality of oscillators are used, they are adjusted to oscillate at different frequencies by varying the resistance of resistors 55. The output of the oscillator 36 appears across the resistor 47, and is coupled to the driver stage 37 by a coupling network 62*a* consisting of capacitors 59 and 60 and a resistor 61. Similar coupling networks 62*b* and 62*c* are provided for the oscillators 35 and 34, and the values of the components are selected so that the outputs of the individual oscillators are at the proper level for providing a balanced mixed output.

The mixed output of the oscillators 34, 35 and 36 is applied to the input of the driver stage 37 by a coupling capacitor 63. The driver stage includes a transistor device 64 operating class B. Direct current voltage is applied to the emitter electrode 65 from the plus terminal 48. The resistor 68 biases the base electrode 66 negatively with respect to the emitter, and the grounded resistance network 69 biases the collector electrode negatively with respect to the base. The inductor 71 prevents alternating current voltages from reaching the bias network. The resistor 72 limits the current flow in the transistor device, and the capacitor 73 serves as a by-pass to prevent degeneration of the circuit.

The driver stage 37 is coupled to the output stage 38 by the transformer 74. The output stage includes four transistor devices connected to operate push-pull-parallel class B. The transistor devices are arranged in two pairs 77 and 78 with the devices in each pair connected in parallel. The emitter electrodes 81 and 82 of the pairs 77 and 78 are connected respectively to resistors 79 and 80 which are series connected together and serve to limit the current flow through the transistor devices. The opposite ends of the secondary winding 75 of the transformer 74 are respectively connected to the base electrodes 83 and 84, and a center tap 87 therein is coupled to the common junction of the resistors 79 and 80. Thus, each half of the secondary winding 75 applies an input signal to one of the pairs of transistor devices 77 and 78. The opposite ends of the output autotransformer 89 are connected respectively to the collector electrodes 85 and 86, while a center tap 88 therein is grounded, so that each half of this winding applies the output of one of the pairs of transistors 77 and 78 to the loudspeaker 39. Direct current voltage is applied to the emitter electrodes 81 and 82 from the plus terminal 48. The resistors 91 and 92 serve as a biasing network, and the resistor 92 is a thermistor which provides temperature compensation.

It is apparent that the amplifier stages 37 and 38 included in the embodiment shown in Fig. 2 will increase the power output of the horn considerably so that the sound produced may be heard at great distances. This is desirable in country driving because the vehicle may be operated at relatively high speeds, and the warning provided by the horn must be heard sufficiently far away to allow the hearer enough time to take whatever precautions may be necessary. Such loud sounds are not needed in city driving where the speeds are usually lower and, in fact, an extremely loud horn may be prohibited by local ordinances or the like. Therefore, the control device 40 is provided to adjust the volume of the horn according to the speed of the vehicle.

The amount of resistance used in the bias network 69 of the transistor device 64 determines the output level of the driver stage 37 and therefore determines the output level of the horn. The switch 101 is operable to connect either resistor 102 or resistor 103 into the biasing network 69, and since the resistance of resistor 102 is considerably lower than that of resistor 103, a high output is obtained when resistor 102 is connected in the bias network and a lower output is obtained when resistor 103 is so connected. Thus, a loud sound may be produced at high speeds and a softer sound at low speeds merely by controlling the switch 101 according to the speed of the vehicle. This is accomplished by the control circuit 40 which is coupled across the breaker points of the ignition system of the vehicle in which the horn is used.

Oscillatory voltage pulses are developed across the inductance and capacitance elements of the standard vehicle ignition system, with the pulse frequency being substantially proportional to the engine speed of the vehicle. The oscillatory components of these voltage pulses are coupled to the control circuit 40 by the capacitor 106. The oscillations are rectified and limited by the resistor 108 and the zener diode 107 which has a fixed inverse breakdown voltage, and this reduces the adverse effect of spurious voltage variations. The resulting signal is applied to an integrating network consisting of the capacitor 109 and the resistors 110 and 111. The integrating network produces a relatively uniform positive voltage at a level which varies with the engine speed, and this voltage is applied as a positive bias voltage to the base 112 of a transistor device 113 opposing the negative bias voltage applied to the base by the biasing network composed of resistors 117, 118, and 119. At low speeds, the transistor device 113 is biased to conduct current so that the coil 114 is energized and closes contacts 116 connecting in the resistor 103 for soft operation. As the vehicle speed goes higher, the bias voltage from the breaker points increases in a positive direction until the transistor device 113 is cut off stopping current flow in the coil 114, and contacts 115 then close to connect in the resistor 102 for loud operation. The cut off point is preferably set at about 45 miles per hour.

Of course, the control circuit 40 may be used with the embodiment shown in Fig. 1 as well if another biasing resistor is coupled in parallel with the resistor 26, and if the switch of the control circuit is connected as in Fig. 2 to select between the different biasing resistors.

It is apparent from the foregoing description that the invention provides an improved electronic horn which may be constructed in various ways to produce different sounds. If a single tone is desired, a very simple horn having one oscillator using only a single transistor device may be constructed. If a combination of tones is desired, a plurality of oscillators are used. An amplifier circuit may be included to increase the loudness of the horn, and a control circuit may be employed to provide loud or soft sounds depending on the speed of the vehicle. Thus, the invention provides considerable flexibility to meet the various requirements and desires of the consuming public. Regardless of which embodiment is employed, the sound produced is pleasing to the ear, and only a relatively small amount of current is consumed so that the invention overcomes major disadvantages of conventional automotive horns.

I claim:

1. An electronic horn for use with an automotive vehicle having an electric energy source and an ignition system, said horn including in combination, oscillator circuit means including transistor means for producing oscillatory electric signals, means including switch means for applying direct current voltage from the electric energy source to said oscillator circuit means for energizing the same, loudspeaker means coupled to said oscillator circuit means for converting said oscillatory electric signals to sound energy of an intensity to warn of the approach of the vehicle, and control circuit means coupled to the ignition system of the vehicle, said control circuit means being operative to change the intensity of the sound produced in response to variation of the speed of the vehicle.

2. An electronic horn for use with an automotive vehicle having an electric energy source and an ignition system, said horn including in combination, oscillator circuit means including transistor means for producing oscillatory electric signals, amplifier circuit means including transistor means coupled to said oscillator circuit means for increasing the level of said signals, means including switch means for applying direct current voltage from the electric energy source to said oscillator circuit means and said amplifier circuit means for energizing the same, loudspeaker means coupled to said amplifier circuit means for converting said oscillatory electric signals to sound energy of sufficient intensity to warn of the approach of the vehicle, and control circuit means coupled to the ignition system of the vehicle, said control circuit means being operative to change the intensity of the sound energy produced to provide a loud sound for high speed vehicle operation and a softer sound for lower speed operation.

3. An electronic horn for use with an automotive vehicle having an electric energy source and an engine having an ignition system, said horn including in combination, oscillator circuit means including transistor means for producing oscillatory electric signals, transistor amplifier circuit means for amplifying said signals and including a bias network having a plurality of different resistance elements for applying different biasing potentials thereto thereby changing the output level thereof, loudspeaker means coupled to said amplifier circuit means for converting the amplified signals to sound energy of an intensity to warn of the approach of the vehicle, and control circuit means being operative to change the intensity of the sound energy produced, said control circuit means including switch means coupled to said different resistance elements of said amplifier bias network and operable to complete a bias circuit through a particular element, relay means including transistor means for operating said switch means, rectifying means having a fixed inverse breakdown voltage coupled to the ignition system of the vehicle and providing a rectified and limited voltage at the output thereof, and integrating network means coupling said rectifying means to said transistor means of said relay means and applying a substantially uniform biasing voltage thereto at a level which varies according to the speed of the engine for cutting off said transistor means at a particular speed to actuate said relay means and change the intensity of the sound produced by said horn.

4. An electronic horn as defined in claim 3 in which said rectifying means of said control circuit means includes zener diode means for clipping and limiting the voltage pulses produced by the vehicle ignition system thereby reducing the adverse effect of spurious voltage variations.

5. An electronic automotive horn for use with an automotive vehicle having an electrical system providing low direct current voltage, said horn including in combination, oscillator means for producing oscillatory electric signals, said oscillator means including a power transistor device having input and output electrodes, a voltage supplying circuit for said transistor device adapted to be connected to the electrical system of the vehicle, a resistive voltage divider network connected in said voltage supplying circuit for applying bias voltage to said transistor device having a value no higher than the voltage of the electrical system, switch means connected in said voltage supplying circuit for controlling the same to energize said oscillator means, a feedback circuit coupled between said output electrode and said input electrode of said transistor device providing regeneration for sustaining oscillations, a portion of said feedback circuit being adjusted to determine the frequency of oscillations, output circuit means coupled to said output electrode of said transistor device including a coil with a tap intermediate the ends thereof forming an autotransformer, and loudspeaker means connected to said tap of said coil for converting said oscillatory electric signals to sound energy of an intensity to warn of the approach of the vehicle at substantial distances, said autotransformer providing impedance matching for said loudspeaker to maximize the power of the signals applied thereto and increase the intensity of the sound produced thereby.

6. An electronic automotive horn for use with an automotive vehicle having an electric energy source providing low direct current voltage and an engine with an ignition system providing oscillatory voltage proportional to the speed of the vehicle, said horn including in combination, oscillator means including transistor means for producing oscillatory electric signals, a voltage supplying circuit for said oscillator means adapted to be connected to the electric energy source of the vehicle for applying direct current voltage to said oscillator means at a level no higher than the voltage of the electric energy source, switch means connected in said voltage supplying circuit for controlling the same to energize said oscillator means, an output circuit coupled to said oscillator means and including loudspeaker means for converting said oscillatory electric signals to sound energy of an intensity to warn of the approach of the vehicle, and a control circuit coupled to the ignition system of the vehicle for controlling the intensity of the sound energy produced by said loudspeaker means in response to variation of the speed of the vehicle, said control circuit comprising means including a transistor device providing a voltage for controlling the level of said oscillatory electric signals, voltage regulator means coupled to the ignition system for removing spurious variations from the oscillatory voltage produced thereby, and a bias control network coupled between said regulator means and said transistor device and including capacitor means providing a relatively smooth voltage of a level which varies with the speed of the vehicle for controlling the operation of said transistor device.

References Cited in the file of this patent

UNITED STATES PATENTS

| | | |
|---|---|---|
| 1,723,168 | Heuss | Aug. 6, 1929 |
| 1,865,428 | Bethenod | July 5, 1932 |
| 2,354,699 | Owens | Aug. 1, 1944 |
| 2,576,585 | Fleming | Nov. 27, 1951 |
| 2,759,179 | Kircher | Aug. 14, 1956 |